United States Patent
Zhu et al.

(10) Patent No.: US 12,126,629 B2
(45) Date of Patent: *Oct. 22, 2024

(54) SYSTEMS AND METHODS FOR IDENTIFYING MALICIOUS CRYPTOGRAPHIC ADDRESSES

(71) Applicant: Capital One Services, LLC, McLean, VA (US)

(72) Inventors: Xiaoguang Zhu, New York, NY (US); Kevin Osborn, Newton Highlands, MA (US); Samuel Rapowitz, Roswell, GA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,109

(22) Filed: Dec. 22, 2023

(65) Prior Publication Data

US 2024/0205236 A1    Jun. 20, 2024

Related U.S. Application Data

(63) Continuation of application No. 17/698,222, filed on Mar. 18, 2022, now Pat. No. 11,856,004.

(51) Int. Cl.
*H04L 9/40* (2022.01)
(52) U.S. Cl.
CPC ................. *H04L 63/14* (2013.01)
(58) Field of Classification Search
None
See application file for complete search history.

(56) References Cited

U.S. PATENT DOCUMENTS

| | | | |
|---|---|---|---|
| 10,037,533 B2 | 7/2018 | Caldera | |
| 10,354,236 B1* | 7/2019 | Wang | G06Q 20/0658 |
| 11,856,004 B2* | 12/2023 | Zhu | H04L 63/14 |
| 2015/0170112 A1* | 6/2015 | DeCastro | G06Q 20/367 |
| | | | 705/39 |
| 2017/0154331 A1 | 6/2017 | Voorhees | |
| 2018/0130061 A1 | 5/2018 | Caldera | |
| 2019/0251629 A1* | 8/2019 | Gordon, III | G06Q 20/389 |
| 2019/0305959 A1* | 10/2019 | Reddy | G06F 8/73 |
| 2020/0076798 A1* | 3/2020 | Lidsky | H04L 9/3228 |
| 2020/0162485 A1 | 5/2020 | Jevans et al. | |
| 2020/0169546 A1 | 5/2020 | Padmanabhan | |
| 2022/0101326 A1 | 3/2022 | Kim et al. | |

* cited by examiner

*Primary Examiner* — Kaveh Abrishamkar
(74) *Attorney, Agent, or Firm* — TROUTMAN PEPPER HAMILTON SANDERS LLP; Christopher J. Forstner; John A. Morrissett

(57) ABSTRACT

Systems and methods for identifying malicious cryptographic wallet addresses are disclosed. The systems and methods can receive a first plurality of tokens and an indication of a potentially malicious cryptographic wallet address from a requesting user. The system can identify a plurality of associated wallet addresses, and compare the associated wallet addresses to a stored list of malicious cryptographic wallet addresses. The system can determine a subset of the identified associated cryptographic wallet addresses that are malicious and assign a maliciousness rating to the potentially malicious cryptographic wallet address. The system can provide the maliciousness rating to the requesting user.

20 Claims, 5 Drawing Sheets

SYSTEMS AND METHODS FOR IDENTIFYING MALICIOUS CRYPTOGRAPHIC ADDRESSES

CROSS-REFERENCE TO RELATED APPLICATIONS

This application is a continuation of, and claims priority under 35 U.S.C. § 120 to, U.S. patent application Ser. No. 17/698,222, filed Mar. 18, 2022, which issues as U.S. Pat. No. 11,856,004 on Dec. 26, 2023, the entire contents of which are fully incorporated herein by reference.

FIELD

The present disclosure relates generally to systems and methods identifying malicious cryptographic addresses and, more particularly, to a decentralized blockchain system that incentivizes reporting of malicious cryptographic addresses.

BACKGROUND

Decentralized ledgers, such as blockchains, are important tools in the digital economy to manage digital assets. Blockchains can be used to manage any number of digital assets, from fine art to currency, the latter otherwise referred to as cryptocurrency. The benefits of blockchain technology include heightened trust in digital transactions, decentralization of transactions so that no single entity controls the environment, and increased security. The security comes, in part, by the fact that the entire record of a digital asset is memorialized and encrypted end-to-end.

However, as blockchain currencies have gained momentum, users of such blockchain systems have increasingly been met with scams as malicious actors use sophisticated methods to fool users into ceding control of their cryptocurrencies. For example, malicious actors advertise guaranteed returns if you send cryptocurrency funds to their address, but once the funds are transferred, the malicious actor can disappear with the stolen funds. In some cases, malicious actors can hijack a computer being used by a user and cause the user to inadvertently send cryptocurrency funds to a wallet under their control instead of a desired recipient. For example, while the user thinks he or she is sending cryptocurrency to a trusted party using the trusted party's cryptographic address, the actual recipient address can be changed without the user's knowledge.

Accordingly there exists a need for a system that can verify whether a respective cryptographic address is associated with a malicious actor before finalizing a transaction. This application is dedicated to these and other considerations.

SUMMARY

Examples of the present disclosure provide solutions to the issues associated with malicious actors stealing cryptocurrency from unsuspecting users. The present disclosure describes a decentralized blockchain system that incentivizes users of the blockchain to report cryptographic wallet addresses that are associated with malicious actors and provides a streamlined method to verify a cryptographic wallet address is not associated with a malicious actor before finalizing a transaction.

A system for identifying malicious cryptographic wallet addresses can include a first plurality of distributed processors and a plurality of distributed non-transient memories in communication with the plurality of distributed processors, and storing instructions that when executed by the first plurality of distributed processors are configured to cause the system to perform steps of a method. The method can include receiving, from a first cryptographic wallet address that is associated with a first cryptographic wallet, a first plurality of tokens and an indication of a second cryptographic wallet address that is associated with a second cryptographic wallet. The method can include identifying, based on the second cryptographic wallet address, a plurality of associated cryptographic wallet addresses. The method can include comparing the plurality of associated cryptographic wallet addresses to a stored list of malicious cryptographic wallet addresses. The method can include determining a subset of the plurality of associated cryptographic wallet addresses that include one more cryptographic wallet addresses based on the comparison. The method can include assigning a malicious rating to the second cryptographic wallet address. The method can include providing the maliciousness rating to the first cryptographic wallet address.

The maliciousness rating of the second cryptographic wallet address can be based in part on a number of malicious cryptographic wallet addresses within the subset of the plurality of associated cryptographic wallet addresses.

In another aspect, a system for identifying malicious cryptographic wallet addresses is disclosed. The system can include a first plurality of distributed processors and a plurality of distributed non-transient memories in communication with the plurality of distributed processors, and storing instructions that when executed by the first plurality of distributed processors are configured to cause the system to perform steps of a method. The method can include receiving from a first cryptographic wallet address associated with a first cryptographic wallet, a first plurality of tokens and an indication of a second cryptographic wallet address that is associated with a second cryptographic wallet. The method can include identifying, based on the second cryptographic wallet address, a plurality of associated cryptographic wallet addresses. The method can include receiving, from a third cryptographic wallet address that is associated with a third cryptographic wallet, a first report indicating that the second cryptographic wallet address is malicious and a second plurality of tokens. The method can include validating the first report based on receiving a threshold number of second reports indicating that the second cryptographic wallet address is malicious. The method can include comparing the plurality of associated cryptographic wallet addresses to a stored list of malicious cryptographic wallet addresses. The method can include determining a subset of the plurality of associated cryptographic wallet addresses including one or more malicious cryptographic wallet addresses based on the comparison. The method can include assigning a maliciousness rating to the second cryptographic wallet address. The method can include providing the maliciousness rating to the first cryptographic wallet address. The method can include, in response to providing the maliciousness rating to the first cryptographic wallet address, sending the second plurality of tokens and a first portion of the first plurality of tokens to the third cryptographic wallet address.

In another aspect, a method for identifying malicious cryptographic wallet addresses is disclosed. The method can include receiving, from a first cryptographic wallet address associated with a first cryptographic wallet, a first plurality of tokens and an indication of a second cryptographic wallet address associated with a second cryptographic wallet. The method can include identifying, based on the second cryptographic wallet address, a plurality of associated cryptographic wallet addresses. The method can include comparing the plurality of associated cryptographic wallet addresses to a stored list of malicious cryptographic wallet addresses.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Figure 1:
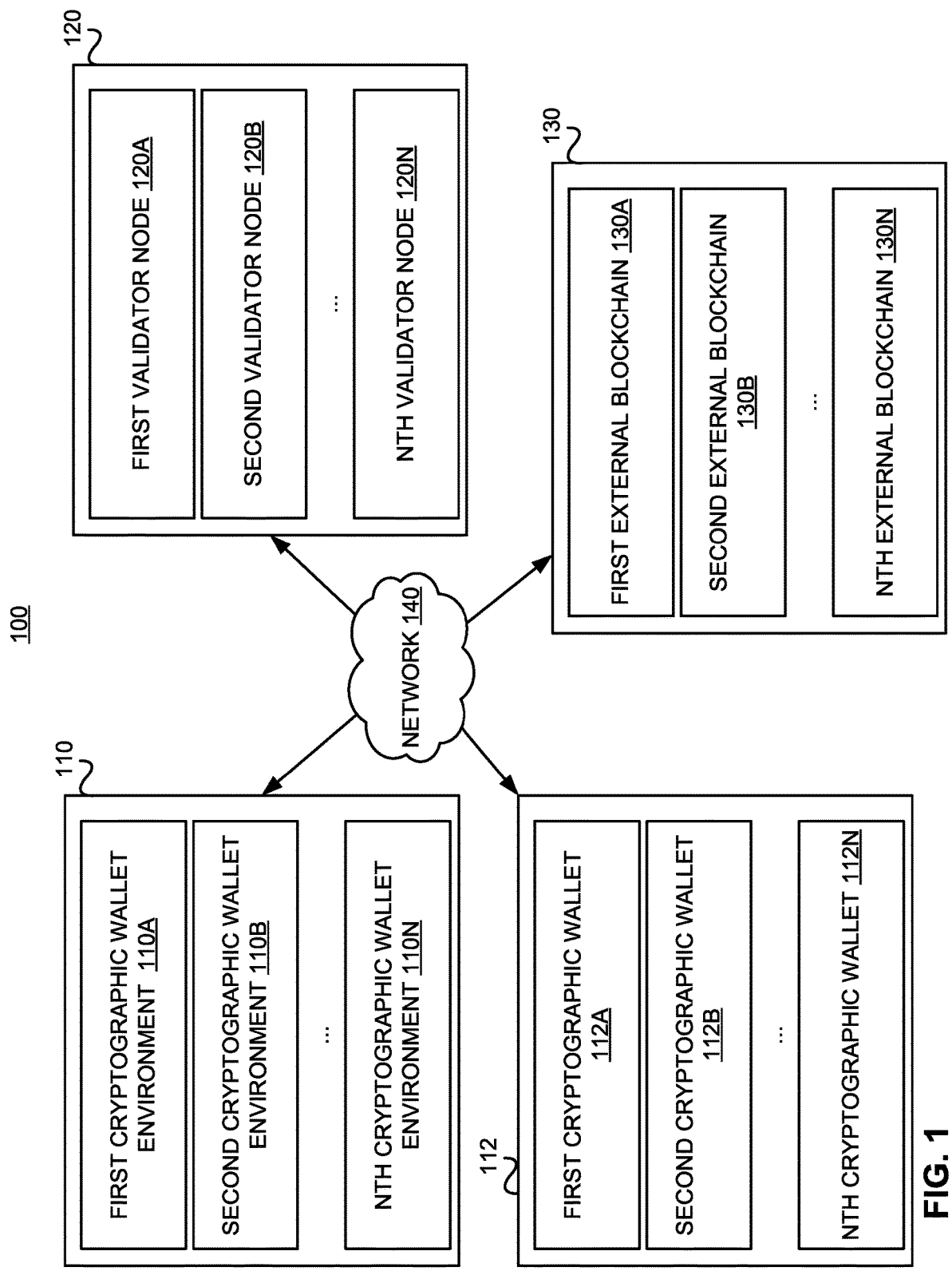
FIG. 1 is a diagram of an example system environment that can be used to implement one or more examples of the present disclosure.

Examples of the present disclosure generally include systems and methods for identifying malicious cryptographic wallets and, more particularly, to a decentralized blockchain system that receives reports from users of the blockchain that identifies cryptographic wallet addresses that are associated with known malicious actors. A benefit of the present systems and methods is that the blockchain system can issue tokens to users that report wallet addresses associated with malicious actors that are subsequently verified, and can "slash" tokens (e.g., take away tokens) from users that misreport wallet addresses as being associated with malicious actors. A benefit of the present systems and methods is that the decentralized blockchain can leverage the received information to enable users to request the system to verify the potential maliciousness of a cryptographic wallet address before sending any cryptocurrency to the wallet address in question, thus preventing funds from being misplaced or stolen by malicious actors.

Incentives can be given to participants of the decentralized blockchain system by requiring that users who want to determine a maliciousness rating of a cryptographic wallet provide a first plurality of tokens to one of the validator nodes of the blockchain. The users reporting on the maliciousness of cryptographic wallets can receive rewards that are funded in part by the tokens provided by the users wanting to determine whether a wallet is malicious. In some aspects, rewards can also be generated by allowing users to stake their tokens by providing tokens to a validator node. Validator nodes can be chosen to verify the maliciousness of a cryptographic wallet based on a number of tokens under the control of a respective validator node. A validator node that successfully determines the maliciousness of a cryptographic wallet can be enabled to generate more tokens which can be distributed to users that contribute to the maliciousness knowledge of the system.

The systems and methods described herein are necessarily rooted in computer technology as they relate to digital security protocols to identify cryptographic wallets associated with malicious actors. The entirety of the system is based upon blockchain technology, meaning the data is distributed among a plurality of end-user computers, which make up the nodes of the system. This environment is vastly different than a typical server/cloud system wherein one entity is in control of the information, keys, and transactions associated with the system. Instead, the blockchain system herein is able to leverage known information, e.g., maliciousness reports provided by users of the blockchain, to identify malicious wallets. Users are incentivized to report malicious cryptographic wallets by receiving tokens in return for a successful report and disincentivized from making false reports by their tokens being taken in response to providing a false maliciousness report.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

FIG. 1 is a diagram of an example system environment 100 that can be used to implement one or more examples of the present disclosure. A more detailed explanation of the components of the system environment 100 is provided below. It is beneficial, however, to provide a brief overview to describe the components of the systems and methods for identifying malicious cryptographic wallet addresses. The system environment 100 can include a plurality of cryptographic wallet environments 110, for example a first cryptographic wallet environment 110A, a second cryptographic wallet environment 110B, a third cryptographic wallet environment 110C, an $N^{th}$ cryptographic wallet 110N, etc. As will be appreciated, there can be any number of cryptographic wallet environments 110 within the system environment 100. Each cryptographic wallet environment 110 can be associated with a respective cryptographic wallet 112. For example, each cryptographic wallet 112 can operate on a respective cryptographic wallet environment 110, such as a user device, as will be described in more detail with respect to FIG. 3. The system environment 100 can also include a plurality of validator nodes 120, for example a first validator node 120A, a second validator node 120B, a third validator node 120C, an $N^{th}$ validator node 120N, etc. The cryptographic wallet environments 110 and validator nodes 120 can be implemented by computing devices, such as a mobile computing device (e.g., smart phone, tablet computer, smart wearable, portable laptop computer, voice command device, wearable augmented reality device, or other mobile computing device) or a stationary device (e.g., a desktop computer, server, etc.), as will be described below with reference to FIGS. 2-3. The system 100 can also include a plurality of external blockchains 130 with which the system 100 communicates with in order to verify whether a respective cryptographic wallet is associated with a malicious actor. The external blockchains can include a first external blockchain 130A, a second external blockchain 130B, a third external blockchain 130C, an $N^{th}$ external blockchain 130N, etc. The external blockchains 130 can sit outside the framework of the blockchain system 100 (e.g., blockchains not implemented by the plurality of validator nodes 120). The validator nodes 120 can be configured to request data from both other validator nodes 120 and the external blockchains 130.

The components/nodes of the system 100 can communicate with each other over a wired or wireless network 140. The network 140 can, therefore, facilitate transactions being made between cryptographic wallet environments 110 (e.g., trades in cryptocurrency, etc.), between the validator nodes 120 (e.g., verification of potentially malicious cryptographic wallets), and between the validator nodes 120 and external blockchains 130 (e.g., receiving blockchain data from an external blockchain by a validator node). In some embodiments, cryptographic wallet environments 110 can be implemented by a user device with an application installed that is associated with the cryptographic wallet 112.

Facilitating communication between components of system 100, the network 140 may be of any suitable type, including individual connections via the Internet such as cellular or WiFi networks. In some embodiments, the network 430 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
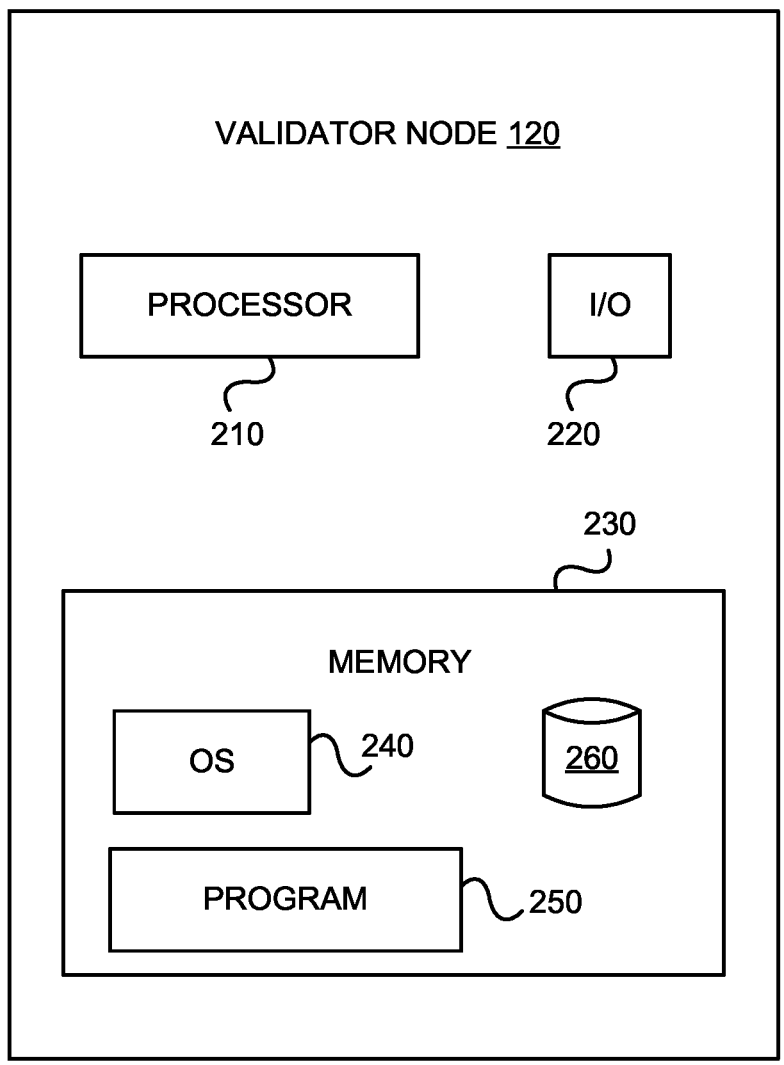
FIG. 2 is a component diagram of an example validator node, according to the present disclosure.

FIG. 2 is a component diagram of an example validator node 120, according to the present disclosure. Validator nodes receive requests from users (e.g., from cryptographic wallet environments 110) to validate a particular cryptographic address as non-malicious. Additionally, validator nodes receive feedback from users that the validator nodes utilize to determine whether a respective cryptographic wallet address is associated with a malicious entity. The requests and feedback received from cryptographic wallet environments 110 are recorded as transactions to the blockchain by validator nodes 120, and the resultant blocks are broadcast to all other validator nodes 120 operating within the blockchain. Validator nodes 120 may include a processor 210, an input/output ("I/O") device 220, a memory 230 containing an operating system ("OS") 240, one or more program(s) 250, and a database 260. For example, validator node 120 may be a single device or a server or may be configured as a distributed computer system including multiple servers, devices, or computers that interoperate to perform one or more of the processes and functionalities associated with the disclosed embodiments. In some embodiments, validator node 120 may further include a peripheral interface, a transceiver, a mobile network interface in communication with processor 210, a bus configured to facilitate communication between the various components of validation node 120, and a power source configured to power one or more components of validator node 120. Servers, databases, and other computing devices (e.g., cryptographic wallet environment(s) 110) included in the system 100 may include many components that are similar to or even have the same capabilities as those described with respect to validator node 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from Intel™ or AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Validator node 120 may include one or more storage devices configured to store information used by the processor 210 (or other components) to perform certain functions related to the disclosed embodiments. In some embodiments, the validator node 120 may include a memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, validator node 120 may include memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, validator node 120 may include memory 230 that may include one or more programs 250 to perform one or more functions of the disclosed embodiments. Moreover, the processor 210 may execute one or more programs 250 located remotely from the validator node 120 (e.g., a program operating on cryptographic wallet environment 110). For example, validator node 120 may access one or more remote programs 250, that, when executed, perform functions related to disclosed embodiments.

The memory 230 may include one or more memory devices that store data and instructions used to perform one or more features of the disclosed embodiments. The Memory 230 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. The memory 230 may also include software, such as Hadoop™, enabling the system to store and process large volumes of data distributed across a cluster of commodity servers and commodity storage connected via the network 140. The memory 230 databases may consist of files on the system 100 that are simply read into the memory, and the disclosed embodiments are not limited to separate databases or even to the use of a database. The memory 230 may include software components that, when executed by the processor 210, perform one or more processes consistent with the disclosed embodiments. In some embodiments, the memory 230 may include a database 260 for storing related data to enable the system 100 to perform one or more of the processes and functionalities associated with the disclosed embodiments.

Validator node 120 may also be communicatively connected to one or more memory devices (e.g., databases) locally or through the network 140. The remote memory devices may be configured to store information and may be accessed and/or managed by bookmark validator nodes 120. By way of example, the remote memory devices may be document management systems, Microsoft™ SQL database, Mongo databases, SharePoint™ databases, Oracle™ databases, Sybase™ databases, or other relational or non-relational databases. The remote memory devices may also include software, such as Hadoop™, enabling them to store and process large volumes of data distributed across a cluster of commodity servers and commodity storage connected via the network 140. These memory devices may consist of files on the system 100 that are simply read into the memory, and the disclosed embodiments are not limited to separate databases or even to the use of a database. Systems and methods consistent with disclosed embodiments, however, are not limited to separate databases or even to the use of a database.

Validator nodes 120 may also include one or more I/O devices 220 that may comprise one or more interfaces for receiving signals or input from devices and providing signals or output to one or more devices that allow data to be received and/or transmitted by validator nodes 120. For example, validator nodes 120 may include interface components, which may provide interfaces to one or more input devices, such as one or more keyboards, mouse devices, touch screens, track pads, trackballs, scroll wheels, digital cameras, microphones, sensors, scanners, and the like, that enable validator nodes 120 to receive data from one or more users.

In exemplary embodiments of the disclosed technology, validator nodes 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While validator nodes 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of validator nodes may include a greater or lesser number of components than those illustrated.

Figure 3:
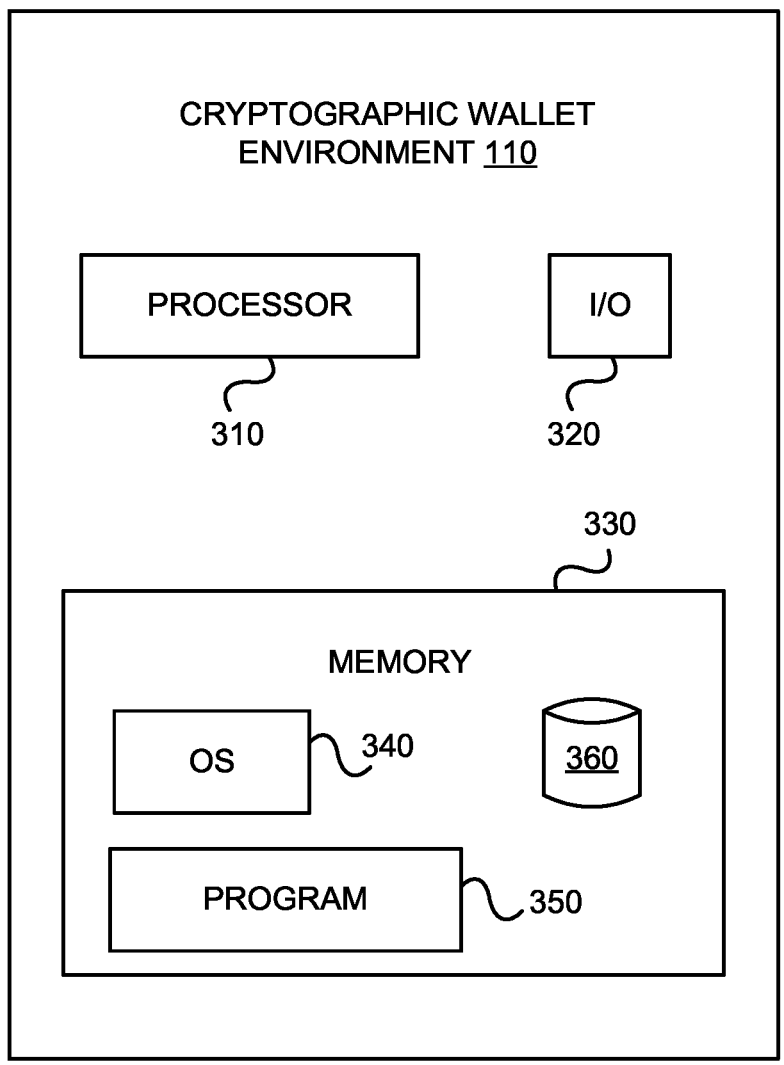
FIG. 3 is a component diagram of an example cryptographic wallet, according to the present disclosure.

FIG. 3 is a component diagram of an example cryptographic wallet environment 110, according to the present disclosure. According to some embodiments, cryptographic wallet environment 110 can be implemented by a computing device, such as a mobile device, desktop computer, laptop, or the like. The cryptographic wallet environment(s) 110 can have many similar components as those described with respect to validator nodes 120. For example, processor 210, I/O 220, memory 230, OS 240, program 250, and database 260 are substantially similar to processor 310, I/O 320, memory 330, OS 340, program 350, and database 360, and so a full description of these components are omitted here for brevity. The cryptographic wallet environment 110 is configured to provide access to a respective cryptographic wallet 112. A cryptographic wallet is a program that can interact with a nodes of a blockchain (e.g., validator nodes 120) to store, send, and receive cryptocurrency tokens native to the blockchain. Each cryptographic wallet has associated public—private key pairs. A wallet cryptographic address is generated based on the public key pair associated with the cryptographic wallet. Users who are given the public key can transfer tokens to the cryptographic wallet associated with the public key, but are not able to spend the tokens without access to the private key. The private key can be used by a user of cryptographic wallet environment 110 to execute transactions (e.g., transferring cryptographic tokens from one cryptographic wallet to another).

Figure 4:
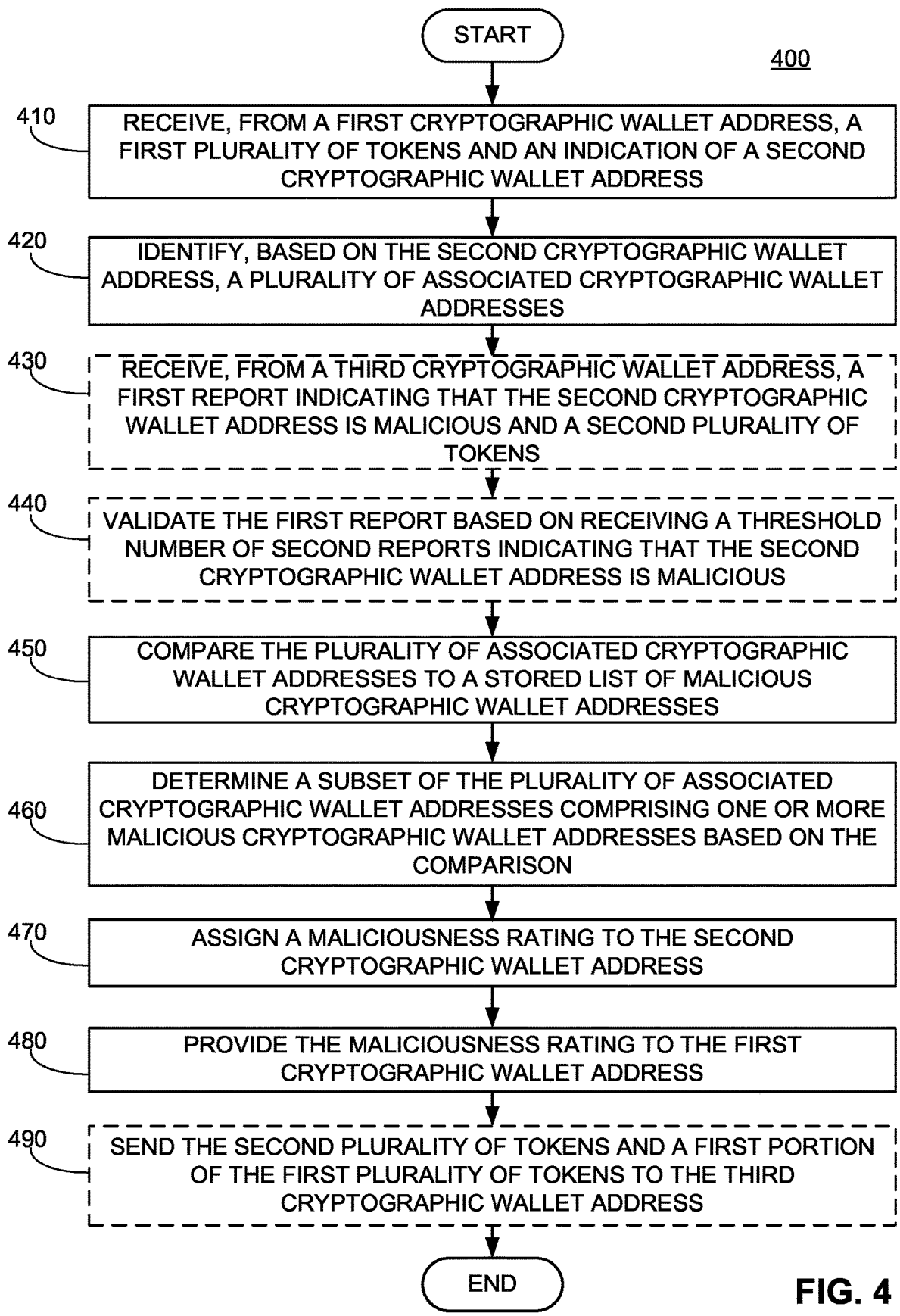
FIG. 4 is a flowchart of an example method for identifying a malicious cryptographic wallet, according to the present disclosure.

FIG. 4 is a flowchart of an example method 400 for identifying a malicious cryptographic wallet, according to the present disclosure. Method 400 can be performed in whole or in part by the components of system 100, including validator nodes 120, cryptographic wallet environments 110, and/or external blockchains 130. In block 410, the method can include receiving, from a first cryptographic wallet address, a first plurality of tokens and an indication of a second cryptographic wallet address. For example, first cryptographic wallet environment 110A can be operated by a first user who wishes to verify whether a potential recipient's cryptographic wallet address is associated with a malicious actor or malicious activity. Accordingly, the first user can send a first plurality of tokens to a validator node (e.g., first validator node 120A) along with a request for verification of a second cryptographic wallet address (e.g., a wallet implemented by second cryptographic wallet environment 110B). The first plurality of tokens can be used by the validator node to provide a "proof of stake," in which a greater number of tokens increases the probability that the first validator node will be chosen to write the next block onto the blockchain. According to some embodiments, upon successfully adding a new block to the blockchain, the validator node may be awarded a plurality of newly minted tokens as a reward incentive by the blockchain protocol.

In block 420, the method can include identifying, based on the second cryptographic wallet address, a plurality of associated cryptographic wallet addresses. For example, upon receiving the request from the first cryptographic wallet environment 110A, the validator node 120 may query the blockchain for records associated with the second cryptographic wallet address. As will be described in more detail with respect to block 430, 440, and 490, the validator nodes receive and store reports from other users of system 100 regarding cryptographic wallet addresses that are considered malicious. For example, the validator node 120A may search through the previous reports and determine whether the second cryptographic wallet address has previously been reported and verified as malicious. In some embodiments, the method can include determining whether any cryptographic wallet addresses associated with the second cryptographic wallet address have been verified as malicious. For example, an associated cryptographic wallet address can be a cryptographic wallet address that the second cryptographic wallet has transacted with. In some embodiments, the associated cryptographic wallet addresses can be determined based on identifying a cryptographic master public key. For example, if the master public key for the second cryptographic wallet address is determined, the system (e.g., validator node 120) can algorithmically determine every cryptographic wallet address that can be generated by the second cryptographic wallet. Accordingly, each cryptographic wallet address associated with the master public key of the second cryptographic wallet can be determined to be malicious.

In optional block 430, the method can include receiving, by a validator node of the plurality of validator nodes 120 and from a third cryptographic wallet address (e.g., from a cryptographic wallet environment 110C), a first report indicating that the second cryptographic wallet address (e.g., implemented by second cryptographic wallet environment 110B) is malicious and a second plurality of tokens. The second plurality of tokens received from the third cryptographic wallet address implemented by cryptographic wallet environment 110C are used by the validator node to incentivize correct reporting of malicious wallet addresses. For example, as will be described in more detail with respect to FIG. 5, a report that a respective cryptographic wallet address is malicious that is found to be incorrect can be disincentivized by returning less than the second plurality of tokens to the third cryptographic wallet address upon a finding that the second cryptographic wallet address is not malicious.

In optional block 440, the method can include validating the first report based on receiving a threshold number of second reports that indicate that the second cryptographic wallet address is malicious. For example, a threshold number of subsequent users can report the same cryptographic wallet address as malicious thereby allowing system 100 to determine that the second cryptographic wallet address 110B is associated with a malicious actor. In some embodiments, the system can determine that the second cryptographic wallet address is associated with a malicious actor by communicating with an external blockchain (e.g., first external blockchain 130A) which can be a blockchain oracle that aggregates data and makes it available to other blockchain networks, such as system 100.

In block 450, the method can include comparing the plurality of associated cryptographic wallet addresses to a stored list of malicious cryptographic wallet addresses. As discussed with respect to optional blocks 430 and 440, the system can include a stored list of malicious cryptographic wallet addresses that have been previously reported by users of system 100 and/or determined by accessing data from an external blockchain 130, such as a blockchain oracle. In block 460, the method can include determining a subset of the plurality of associated cryptographic wallet addresses that include one or more malicious cryptographic wallet addresses. For example, if the second cryptographic wallet address itself is not found on the list of malicious cryptographic wallets, but three related wallet addresses are found on the list, the system can determine that there are three malicious cryptographic wallet addresses associated with the second cryptographic wallet address. In some embodiments, the second cryptographic wallet address itself may be present on the stored list of malicious cryptographic wallet addresses rather than a cryptographic wallet address that is merely associated with the second cryptographic wallet address.

In block 470, the method can include assigning a maliciousness rating to the second cryptographic wallet address. The maliciousness rating can be determined based in part on a number of malicious cryptographic wallet addresses within the subset of the plurality of associated cryptographic wallet addresses. In some embodiments, the second cryptographic wallet address can be given a maximum malicious rating (e.g., a score of 100 on a scale of 0 to 100) when the second cryptographic wallet address has a number of malicious cryptographic wallet addresses that are determined to be malicious beyond a predetermined threshold. In some embodiments, the maliciousness score can also be determined based in part on metadata associated with the stored list of malicious cryptographic addresses. For example, an associated malicious cryptographic wallet address can influence the maliciousness score assigned to the second cryptographic wallet address more highly as more misappropriated cryptocurrency tokens are associated with the respective malicious cryptographic wallet address. According to some embodiments, the system can determine the maliciousness rating of the second cryptographic wallet address based on a number of reports of malicious activity associated with the cryptographic wallet address, a number of reports of malicious activity associated with a related cryptographic wallet address that the system determines is controlled by the same entity (e.g., by determining that the two wallets are associated with the same cryptographic public key), the total dollar amount of malicious activity associated with the cryptographic wallet address, and/or the recency of malicious activity associated with the cryptographic wallet address.

In some embodiments, the maliciousness rating can be determined by a smart contract that is implemented by the blockchain by the plurality of validator nodes 120. For example, the first plurality of tokens provided to the validator node by the first cryptographic wallet can be used to initiate a smart contract between the first cryptographic wallet and the third cryptographic wallet responsible for providing the maliciousness report associated with the potential recipient wallet (i.e., the second cryptographic wallet address). In some embodiments, the smart contract provides at least a portion of the first plurality of tokens to the third cryptographic wallet subsequent to the maliciousness rating being provided to the first cryptographic wallet.

In some embodiments, the maliciousness rating can be based in part on the recency of each of the threshold number of second reports. For example, a report that is more recent in time may be given more weight than a report that is less recent.

In block 480, the method can include providing the maliciousness rating to the first cryptographic wallet address. For example, the validator node can transmit the maliciousness rating to the first cryptographic wallet address. In some embodiments, the first plurality of tokens are not returned to the first cryptographic wallet, and instead are kept by the validator node as payment for the service of determining the maliciousness rating of the second cryptographic wallet address.

In optional block 490, the method can include sending the second plurality of tokens and a first portion of the first plurality of tokens to the third cryptographic wallet address. In other words, the second plurality of tokens received from the third cryptographic wallet address (e.g., implemented by third cryptographic wallet address environment 110C) are returned to the third cryptographic wallet address plus an additional number of tokens. According to some embodiments, a portion of the tokens provided by the first cryptographic wallet address (e.g., the tokens "paid" by the user to determine maliciousness of a potential recipient wallet address) are provided to the third cryptographic wallet address as an incentive for the reporting of maliciousness of the second cryptographic wallet address and/or any cryptographic wallet address that is associated with the second cryptographic wallet address.

In some embodiments, the additional tokens that are sent to the third cryptographic wallet address can come directly from a validator node 120. Validator node 120 can be issued newly minted tokens in response for a successful validation of a malicious cryptographic wallet address. Accordingly, at least a portion of the newly minted tokens can be transferred to the third cryptographic wallet address in order to incentivize reporting of malicious cryptographic wallets.

In some embodiments, the number of additional tokens received by the third cryptographic wallet address in block 490 is based at least in part on the maliciousness rating assigned to the second cryptographic wallet address in block 470.

In some embodiments, the first plurality of tokens and the second plurality of tokens are each a native token associated with the first blockchain that is implemented by the validator nodes 120. According to some embodiments, the second cryptographic wallet address can be associated with a second blockchain that is separate from the first blockchain. For example, the second blockchain can be an external blockchain 130 (e.g., second external blockchain 130B).

Figure 5:
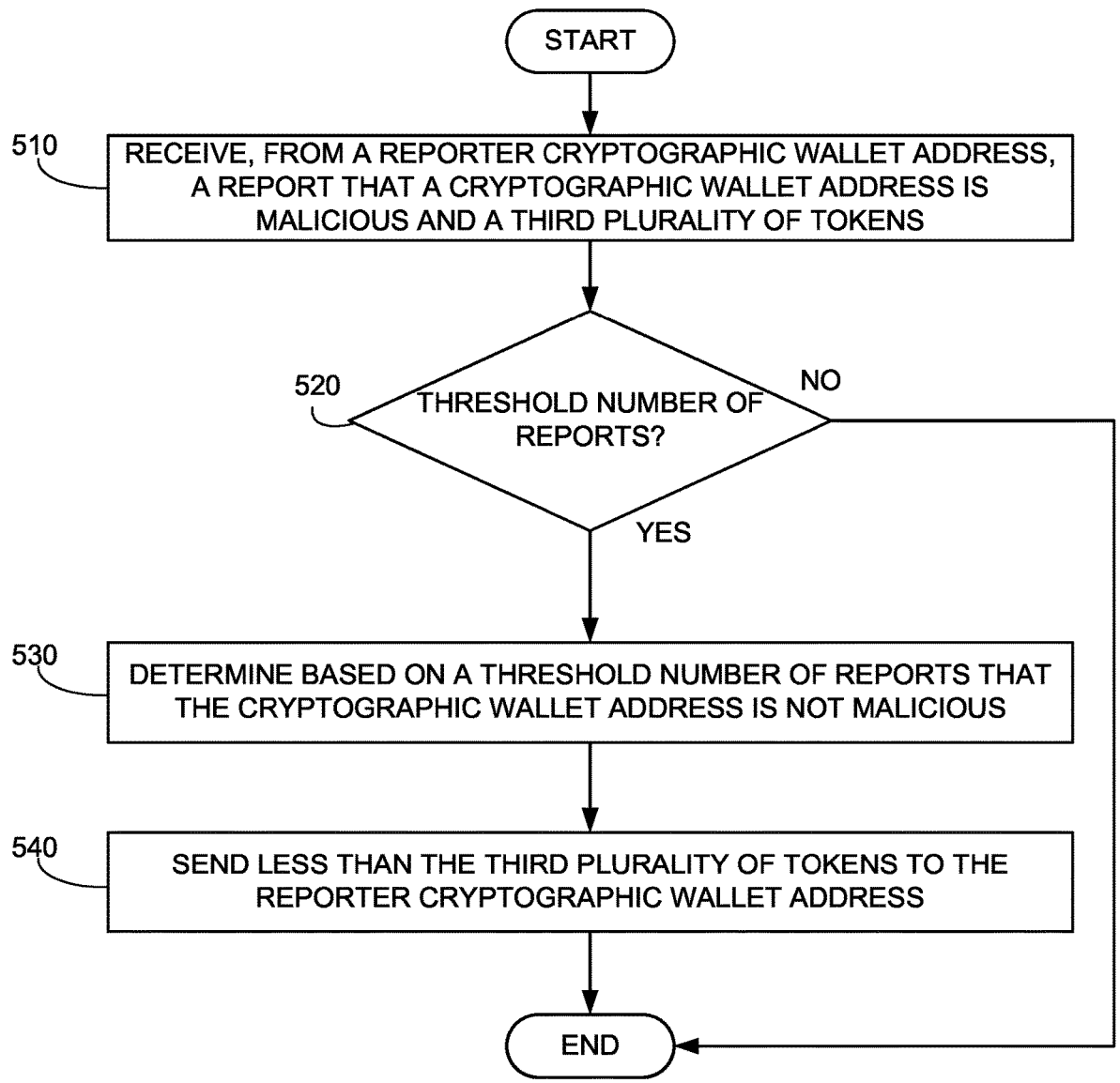
FIG. 5 is a flowchart of an example method for penalizing a user for a false maliciousness reporting, according to the present disclosure.

FIG. 5 is a flowchart of an example method 500 penalizing a user for a false maliciousness reporting, according to the present disclosure. Method 500 can be performed in whole or in part by the components of system 100, including validator nodes 120, cryptographic wallet environments 110, and/or external blockchains 130. In block 510, the method can include receiving (e.g., by a validator node 120), from a reporter cryptographic wallet address (e.g., a fourth cryptographic wallet address implemented by a fourth cryptographic wallet address environment 110D), a report that a cryptographic wallet address (e.g., implemented by a fifth cryptographic wallet environment 110E) is malicious in addition to receiving a third plurality of tokens. In some embodiments, a smart contract can be implemented that rewards a reporter cryptographic wallet address for correctly reporting a malicious wallet address and/or punishes the reporter cryptographic wallet address for incorrectly reporting a wallet address as malicious.

In decision block 520, the validator node can verify whether a threshold number of reports of maliciousness are recorded on the blockchain in association with the fifth cryptographic wallet environment 110E. Responsive to determining (e.g., by one of the plurality of validator nodes 120) that the threshold number of reports indicate that the fifth cryptographic wallet environment 110E is malicious, the method may end. In response to determining that the fifth cryptographic wallet is not malicious based on the threshold number of reports, the method may move to block 530.

In block 530, the method can include determining that the fifth cryptographic wallet environment 110E is not malicious. In block 540, the method can include sending less than the third plurality of tokens to the reporter cryptographic wallet address (e.g., fourth cryptographic wallet environment 110D).

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A system for identifying malicious cryptographic wallet addresses, the system comprising: a first plurality of distributed processors; a plurality of distributed non-transient memories in communication with the plurality of distributed processors and storing instructions, that when executed by the first plurality of distributed processors are configured to cause the system to: receive, from a first cryptographic wallet address associated with a first cryptographic wallet, a first plurality of tokens and an indication of a second cryptographic wallet address associated with a second cryptographic wallet; identify, based on the second cryptographic wallet address, a plurality of associated cryptographic wallet addresses; compare the plurality of associated cryptographic wallet addresses to a stored list of malicious cryptographic wallet addresses; determine a subset of the plurality of associated cryptographic wallet addresses comprising one or more malicious cryptographic wallet addresses based on the comparison; assign a maliciousness rating to the second cryptographic wallet address; and provide the maliciousness rating to the first cryptographic wallet address.

Clause 2: The system of clause 1, wherein the maliciousness rating of the second cryptographic wallet address is based in part on a number of malicious cryptographic wallet addresses within the subset of the plurality of associated cryptographic wallet addresses.

Clause 3: The system of clause 1, wherein the plurality of distributed memories store instructions that when executed by the first plurality of distributed processors are configured to cause the system to: receive, from a third cryptographic wallet address associated with a third cryptographic wallet, a first report indicating that the second cryptographic wallet address is malicious and a second plurality of tokens; validate the first report based on receiving a threshold number of second reports indicating that the second cryptographic wallet address is malicious; responsive to providing the maliciousness rating to the first cryptographic wallet address, send the second plurality of tokens and a first portion of the first plurality of tokens to the third cryptographic wallet address.

Clause 4: The system of clause 3, wherein the first portion of the first plurality of tokens is based in part on maliciousness rating of the second cryptographic wallet address.

Clause 5: The system of clause 3, wherein the maliciousness rating is based in part on a recency of the threshold number of second reports.

Clause 6: The system of clause 3, wherein each token of the first plurality of tokens and the second plurality of tokens comprise a native token associated with a first blockchain implemented by the plurality of distributed processors.

Clause 7: The system of clause 6, wherein the second cryptographic wallet address is associated with a second blockchain that is separate from the first blockchain.

Clause 8: The system of clause 7, wherein the second blockchain is implemented by a second plurality of distributed processors different than the first plurality of distributed processors.

Clause 9: The system of clause 1, wherein the maliciousness rating is determined by a smart contract implemented by the plurality of distributed processors.

Clause 10: The system of clause 1, wherein the plurality of distributed memories store instructions that when executed by the first plurality of distributed processors are configured to cause the system to: receive, from a fourth cryptographic wallet address associated with a fourth cryptographic wallet, a third report that a fifth cryptographic wallet address associated with a fifth wallet is malicious and a third plurality of tokens; determine, based on a threshold number of fourth reports, that the fifth cryptographic wallet address is not malicious; and send less than the third plurality of tokens to the fourth cryptographic wallet address.

Clause 11: A system for identifying malicious cryptographic wallet addresses, the system comprising: a first plurality of distributed processors; a plurality of distributed non-transient memories in communication with the plurality of distributed processors and storing instructions, that when executed by the first plurality of distributed processors are configured to cause the system to: receive, from a first cryptographic wallet address associated with a first cryptographic wallet, a first plurality of tokens and an indication of a second cryptographic wallet address associated with a second cryptographic wallet; identify, based on the second cryptographic wallet address, a plurality of associated cryptographic wallet addresses; receive, from a third cryptographic wallet address associated with a third cryptographic wallet, a first report indicating that the second cryptographic wallet address is malicious and a second plurality of tokens; validate the first report based on receiving a threshold number of second reports indicating that the second cryptographic wallet address is malicious; compare the plurality of associated cryptographic wallet addresses to a stored list of malicious cryptographic wallet addresses; determine a subset of the plurality of associated cryptographic wallet addresses comprising one or more malicious cryptographic wallet addresses based on the comparison; assign a maliciousness rating to the second cryptographic wallet address; provide the maliciousness rating to the first cryptographic wallet address; and responsive to providing the maliciousness rating to the first cryptographic wallet address, send the second plurality of tokens and a first portion of the first plurality of tokens to the third cryptographic wallet address.

Clause 12: The system of clause 11, wherein the maliciousness rating of the second cryptographic wallet addresses is based in part on a number of malicious cryptographic wallet addresses within the subset of the plurality of associated cryptographic wallet addresses.

Clause 13: The system of clause 11, wherein the first portion of the first plurality of tokens is based in part on maliciousness rating of the second cryptographic wallet address.

Clause 14: The system of clause 11, wherein the maliciousness rating is based in part on a recency of the threshold number of second reports.

Clause 15: The system of clause 11, wherein each token of the first plurality of tokens and the second plurality of tokens comprise a native token associated with a first blockchain implemented by the plurality of distributed processors.

Clause 16: The system of clause 15, wherein the second cryptographic wallet address is associated with a second blockchain that is separate from the first blockchain.

Clause 17: The system of clause 16, wherein the second blockchain is implemented by a second plurality of distributed processors different than the first plurality of distributed processors.

Clause 18: The system of clause 11, wherein the maliciousness rating is determined by a smart contract implemented by the plurality of distributed processors.

Clause 19: A method for identifying malicious cryptographic wallet addresses, the method comprising: receiving, from a first cryptographic wallet address associated with a first cryptographic wallet, a first plurality of tokens and an indication of a second cryptographic wallet address associated with a second cryptographic wallet; identifying, based on the second cryptographic wallet address, a plurality of associated cryptographic wallet addresses; comparing the plurality of associated cryptographic wallet addresses to a stored list of malicious cryptographic wallet addresses; determining a subset of the plurality of associated cryptographic wallet addresses comprising one or more malicious cryptographic wallet addresses based on the comparison; assigning a maliciousness rating to the second cryptographic wallet address; and providing the maliciousness rating to the first cryptographic wallet address.

Clause 20: The method of clause 19, further comprising: receiving, from a third cryptographic wallet address associated with a third cryptographic wallet, a first report indicating that the second cryptographic wallet address is malicious and a second plurality of tokens; validating the first report based on receiving a threshold number of second reports indicating that the second cryptographic wallet address is malicious; and responsive to providing the maliciousness rating to the first cryptographic wallet address, sending the second plurality of tokens and a first portion of the first plurality of tokens to the third cryptographic wallet address.

Exemplary Use Cases

The following exemplary use cases describe examples of a typical user flow pattern. They are intended solely for explanatory purposes and not limitation.

Adam is a cryptocurrency investor, who wants to invest in a new protocol that requires sending his tokens to a cryptographic wallet controlled by the protocol. Before Adam sends his tokens to the cryptographic wallet, Adam decides to first determine the potential maliciousness of the cryptographic wallet. Accordingly, Adam sends tokens to a validator node (e.g., validator node 120A) of the maliciousness verification system (e.g., system 100). The validator node can implement a smart contract that uses the received tokens to verify whether there are any reports from other users of the system showing that the cryptographic wallet or any associated cryptographic wallets are malicious. Tom has knowledge that the cryptographic wallet associated with the protocol is malicious and reports this knowledge to one of the plurality of validator nodes 120 in addition to staking a sum of his tokens. The validator node confirms Tom's report based on a subsequent threshold number of reports confirming Tom's report of maliciousness. Accordingly, the smart contract provides Adam with a maliciousness rating of 70/100—likely malicious and provides Tom with his tokens as well as a number of additional tokens as an incentive to Tom to keep reporting malicious cryptographic wallet addresses. Adam, armed with the knowledge that the recipient wallet address is likely malicious, can avoid the loss of his funds by avoiding the transaction entirely.

What is claimed is:

1. A system for identifying malicious cryptographic wallet addresses, the system comprising:
   a plurality of distributed processors; and
   a plurality of distributed non-transient memories in communication with the plurality of distributed processors and storing instructions, that when executed by the plurality of distributed processors are configured to cause the system to:
   receive, from reporter cryptographic wallet addresses, a plurality of reports identifying malicious cryptographic wallet addresses;
   receive, from a first cryptographic wallet address associated with a first cryptographic wallet, a first plurality of tokens and a validation request for a second cryptographic wallet address associated with a second cryptographic wallet;
   query the plurality of reports to identify a subset of the malicious cryptographic wallet addresses that are associated with the second cryptographic wallet address based on the query of the subset;
   assign a maliciousness rating to the second cryptographic wallet address;
   provide the maliciousness rating to the first cryptographic wallet address; and
   transmit at least a portion of the first plurality of tokens to at least a portion of the reporter cryptographic wallet addresses.

2. The system of claim 1, wherein identifying the subset of the malicious cryptographic wallet addresses that are associated with the second cryptographic wallet address is further based on identifying a master public key associated with the second cryptographic wallet address.

3. The system of claim 1, wherein the instructions are further configured to cause the system to:
   receive, from second reporter cryptographic wallet addresses, a second plurality of reports indicating that the second cryptographic wallet address is malicious;
   determine whether the second plurality of reports exceeds a threshold number of reports; and
   responsive to determining the second plurality of reports exceeds the threshold number of reports:
   validate the plurality of reports; and
   transmit at least a portion of a second plurality of tokens to at least a portion of the second reporter cryptographic wallet addresses.

4. The system of claim 3, wherein the maliciousness rating is based in part on a recency of the threshold number of second reports.

5. The system of claim 1, wherein each token of the first plurality of tokens comprises a native token associated with a first blockchain implemented by the plurality of distributed processors.

6. The system of claim 5, wherein the second cryptographic wallet address is associated with a second blockchain that is separate from the first blockchain.

7. The system of claim 6, wherein the second blockchain is implemented by a second plurality of distributed processors different than the plurality of distributed processors.

8. The system of claim 1, wherein the maliciousness rating is determined by a smart contract implemented by the plurality of distributed processors.

9. A method for identifying malicious cryptographic wallet addresses, the method comprising:
   receiving, from reporter cryptographic wallet addresses, a plurality of reports identifying malicious cryptographic wallet addresses;
   receiving, from a first cryptographic wallet address associated with a first cryptographic wallet, a first plurality of tokens and a validation request for a second cryptographic wallet address associated with a second cryptographic wallet;
   querying the plurality of reports to identify a subset of the malicious cryptographic wallet addresses that are associated with the second cryptographic wallet address based on the query of the subset;

assigning a maliciousness rating to the second cryptographic wallet address;
providing the maliciousness rating to the first cryptographic wallet address; and
transmitting at least a portion of the first plurality of tokens to at least a portion of the reporter cryptographic wallet addresses.

10. The method of claim 9, further comprising:
receiving, from second reporter cryptographic wallet addresses, a second plurality of reports indicating that the second cryptographic wallet address is malicious;
determining whether the second plurality of reports exceeds a threshold number of reports; and
responsive to determining the second plurality of reports exceeds the threshold number of reports:
validating the plurality of reports; and
transmitting at least a portion of a second plurality of tokens to at least a portion of the second reporter cryptographic wallet addresses.

11. The method of claim 9, further comprising:
receiving, from second reporter cryptographic wallet addresses, a second plurality of reports indicating that the second cryptographic wallet address is malicious;
determining that at least a first portion of the second plurality of reports are incorrect; and
responsive to determining that the first portion of the second plurality of reports are incorrect, transmit less than a second plurality of tokens to at least a portion of the second reporter cryptographic wallet addresses.

12. The method of claim 9, wherein each token of the first plurality of tokens comprises a native token associated with a first blockchain.

13. The method of claim 12, wherein the second cryptographic wallet address is associated with a second blockchain that is separate from the first blockchain.

14. The method of claim 9, wherein the maliciousness rating is determined by a smart contract implemented by a plurality of distributed processors.

15. A system for identifying malicious cryptographic wallet addresses, the system comprising:
a plurality of distributed processors; and
a plurality of distributed non-transient memories in communication with the plurality of distributed processors and storing instructions, that when executed by the plurality of distributed processors are configured to cause the system to:
receive, from a reporter cryptographic wallet address, a first report identifying malicious cryptographic wallet addresses;
receive, from a first cryptographic wallet address associated with a first cryptographic wallet, a first plurality of tokens and a validation request for a second cryptographic wallet address associated with a second cryptographic wallet;
identify a subset of the malicious cryptographic wallet addresses that are associated with the second cryptographic wallet address;
assign a maliciousness rating to the second cryptographic wallet address;
provide the maliciousness rating to the first cryptographic wallet address; and
transmit at least a portion of the first plurality of tokens to the reporter cryptographic wallet address.

16. The system of claim 15, wherein the instructions are further configured to cause the system to:
receive, from a second reporter cryptographic wallet address, a second report indicating that the second cryptographic wallet address is malicious;
determine whether the second report exceeds a threshold number of received reports; and
responsive to determining the second report exceeds the threshold number of received reports:
validate the first report; and
transmit at least a portion of a second plurality of tokens to the second reporter cryptographic wallet address.

17. The system of claim 16, wherein the maliciousness rating is based in part on a recency of the threshold number of received reports.

18. The system of claim 15, wherein identifying the subset of the malicious cryptographic wallet addresses that are associated with the second cryptographic wallet address is based on identifying a master public key associated with the second cryptographic wallet address.

19. The system of claim 15, wherein the instructions are further configured to cause the system to:
receive, from a second reporter cryptographic wallet address, a second report indicating that the second cryptographic wallet address is malicious;
determine that the second report is incorrect; and
responsive to determining the second report is incorrect, transmit less than a second plurality of tokens to the second reporter cryptographic wallet address.

20. The system of claim 15, wherein the maliciousness rating is determined by a smart contract implemented by the plurality of distributed processors.

* * * * *